United States Patent
Eichholz et al.

(10) Patent No.: US 9,168,486 B2
(45) Date of Patent: Oct. 27, 2015

(54) AEROSOL TRAPPING

(71) Applicant: SANHUA AWECO Appliance Systems GmbH, Neukirch (DE)

(72) Inventors: Heinz-Dieter Eichholz, Iserlohn (DE); Peter Nenning, Scheidegg (DE)

(73) Assignee: SANHUA AWECO APPLIANCE SYSTEMS GMBH, Neukirch (DE)

( * ) Notice: Subject to any disclaimer, the term of this patent is extended or adjusted under 35 U.S.C. 154(b) by 0 days.

(21) Appl. No.: 14/306,178

(22) Filed: Jun. 16, 2014

(65) Prior Publication Data

US 2014/0366740 A1    Dec. 18, 2014

(30) Foreign Application Priority Data

Jun. 17, 2013   (DE) .......................... 10 2013 010 039

(51) Int. Cl.
*B01D 53/14* (2006.01)
*A47L 15/48* (2006.01)
*D06F 58/24* (2006.01)

(52) U.S. Cl.
CPC ............... *B01D 53/14* (2013.01); *A47L 15/481* (2013.01); *D06F 58/24* (2013.01); *B01D 2257/80* (2013.01)

(58) Field of Classification Search
None
See application file for complete search history.

(56) References Cited

U.S. PATENT DOCUMENTS

| 6,887,303 | B2 * | 5/2005 | Hesse et al. ......................... 96/8 |
| 7,306,654 | B2 * | 12/2007 | King et al. ..................... 95/224 |
| 2005/0241485 | A1 * | 11/2005 | Wscher et al. .................. 96/299 |
| 2011/0056384 | A1 * | 3/2011 | Kadota ........................... 96/407 |

FOREIGN PATENT DOCUMENTS

| DE | 690 00 581 T2 | 8/1990 |
| DE | 10 2010 047 058 A1 | 4/2011 |
| DE | 10 2011 117 734 A1 | 2/2013 |
| EP | 0 381 647 A1 | 8/1990 |
| EP | 1 097 669 A2 | 5/2001 |
| EP | 1 983 091 A1 | 10/2008 |
| WO | WO 97/38780 | 10/1997 |
| WO | WO 2004/056448 A2 | 7/2004 |

OTHER PUBLICATIONS

English translation of DE102010047058 accessed Oct. 16, 2014.*
English translation of DE102010047058 accessed Feb. 26, 2015.*

* cited by examiner

*Primary Examiner* — Duane Smith
*Assistant Examiner* — Phillip Shao
(74) *Attorney, Agent, or Firm* — Breneman & Georges

(57) ABSTRACT

A household appliance having a drying apparatus, such as a dishwasher, a washer-drier, a washing machine or the like, is shown according to the invention, wherein a contact zone is provided in a contact chamber for extracting moisture out of the air, which originates from a working chamber of the household appliance, by means of contact between the air and a hygroscopic liquid and wherein a separating element is present for separating hygroscopic liquid out of the air, characterized in that a separating surface is formed downstream of the contact chamber in the direction of flow by the surface of the wall of an air duct.

18 Claims, 2 Drawing Sheets

Figure 1:
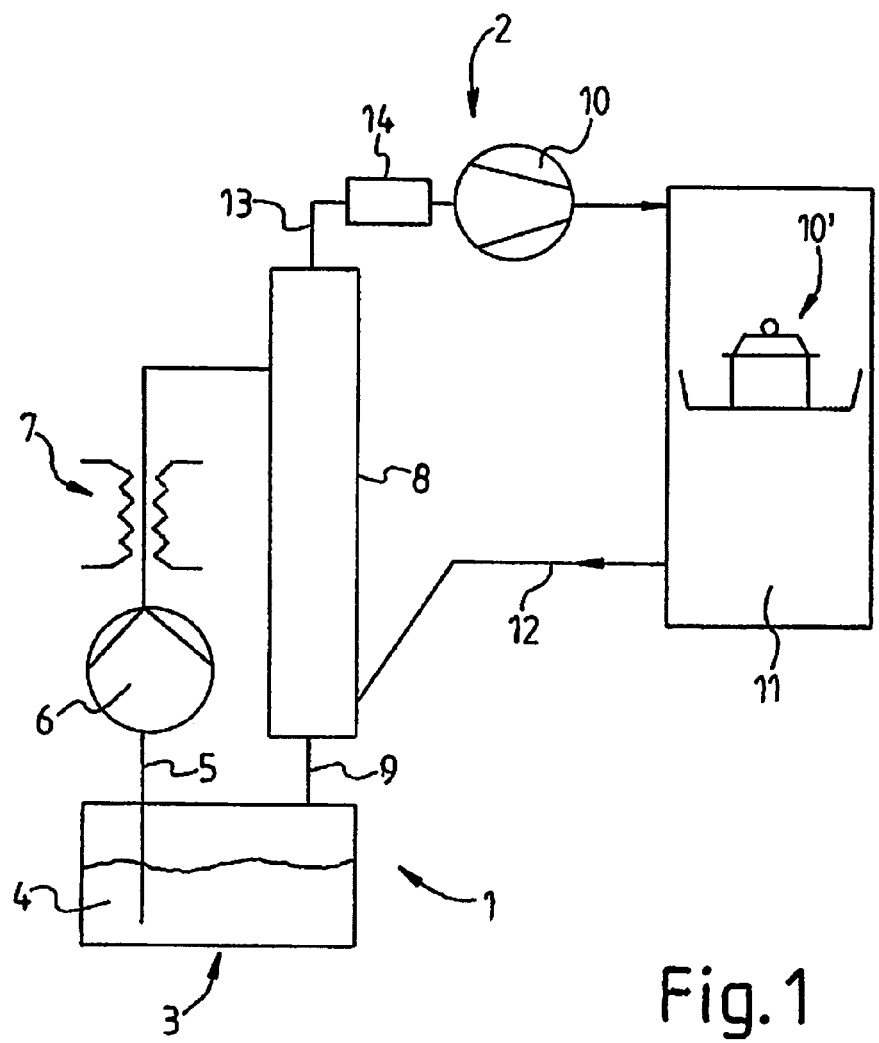

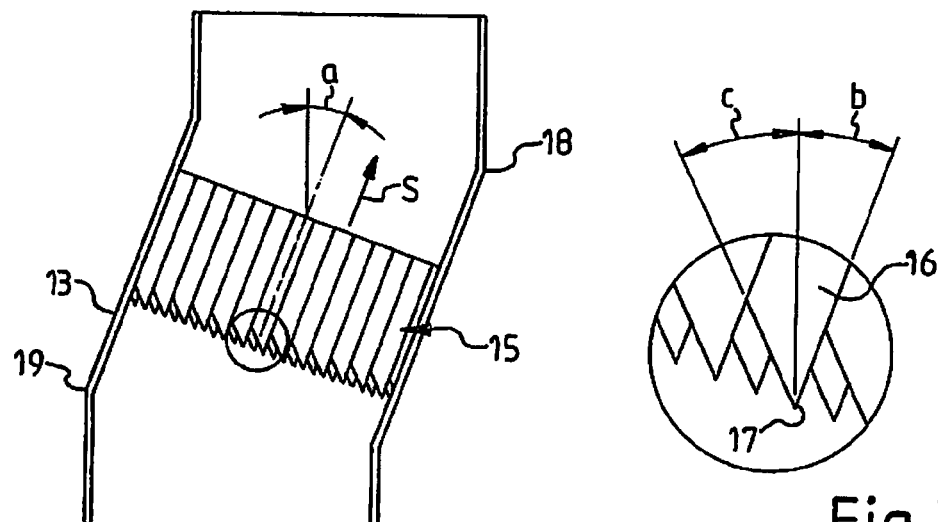
Fig. 2
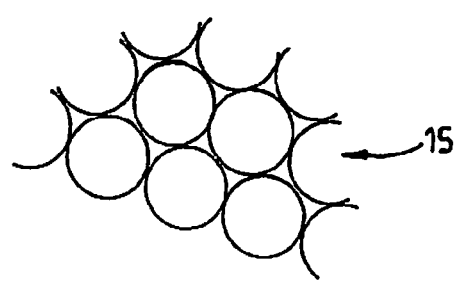
Fig. 3
Fig. 4

AEROSOL TRAPPING

The invention relates to a household appliance having a drying apparatus, such as a dishwasher, a washer-drier, a washing machine or the like, according to the preamble of Claim 1.

A household appliance of this type has been described, for example, in documents 10 2010 047 058 A1 or DE 10 2011 117 734 A1.

A problem when realizing such a household appliance or drying apparatus consists, on the one hand, in providing a high contact surface between the hygroscopic liquid and the air to be dried and, on the other hand, in collecting the hygroscopic liquid again once the liquid has been extracted out of the air and supplying it to a storage container.

The surface-enlarging liquid results in smaller and smaller droplets which can ultimately form an aerosol. The smaller the liquid droplets, the more problematic the separation out of the dried air.

A further set of problems when realizing such a drying apparatus consists in that modern household appliances have to have an increasingly smaller energy consumption such that no large pressure differences or flow resistances can be coped with by a liquid separating apparatus. Said pressure differences would require the air to be dried to be conveyed in a correspondingly pressurized manner which, in turn, is expensive.

Consequently, it is the object of the invention to propose an apparatus according to the preamble of Claim 1 where it is possible to separate the liquid droplets out of the air to be dried without any notable pressure differences in the air circuit.

This is achieved according to the invention by the characteristic features of Claim 1.

Advantageous designs and further developments of the invention are possible as a result of the measures named in the sub-claims.

Accordingly, a household appliance according to the invention is distinguished in that the separating surface of the drying apparatus is formed by the surface of the wall of an air duct.

As a result of said design, it is possible to separate the liquid with minimum pressure loss or minimum flow resistance in the air flow such that the energy consumption of the household appliance is not increased as a result of the liquid separation.

At the same time, the wall of an air duct presents the possibility of a sufficiently large separating surface in order to manage the necessary separation of the liquid.

It is preferred in this connection for the extension of the separating surface in the direction of the air flow to be chosen as a multiple of the extension transversely with respect to the direction of the air flow. As a result of said design, the separating surface is enlarged and at the same time the side of the traversed air in contact with the separating surface is also enlarged. Better separation of the liquid is produced as a result.

In a preferred manner, several air ducts are provided with walls which comprise separating surfaces for the separation of the liquid. In this way the absolute total of the face of the separating surfaces can be increased without, in turn, increasing the pressure loss or the flow resistance in a considerable manner. As a result of such a measure, the separation of the liquid can consequently be further improved without any substantial increase in the energy consumption of the household appliance.

In a preferred embodiment of the invention, in this connection, a bundle of several tubes is provided as the separating element. Such a bundle of tubes can be realized in an advantageous manner as a separating element which can be handled as one unit and during assembly can be inserted easily into the interior of a pipeline with a corresponding diameter. Such a bundle of tubes, in this case, realizes the air flow through different air ducts, that is the above-mentioned advantages of improved separation are maintained in this case without any considerable impairment of the pressure ratios or of the flow resistance.

In an advantageous manner, such a bundle of tubes is arranged in an inclined manner with respect to a horizontal alignment such that a gravimetrically determined direction of flow is produced for the separated liquid.

The arrangement of a separating surface, inclined in this manner, is advantageous not only when using a bundle of tubes, but also in general for each duct wall used according to the invention which forms a separating surface. The inclined arrangement results in a marked direction of flow being produced for the separated liquid such that the return of the separated liquid into a liquid store is facilitated.

In a preferred embodiment of the invention, one or several tubes with a separating surface, which, in particular, can be a component part of a bundle of tubes, are beveled on the side which is downwardly inclined in relation to the horizontal alignment or at the downwardly inclined end. As a result, the drip behavior is improved. The risk that liquid stays longer in a substantial region of the cross section of such a tube as a result of surface tension or other effects is consequently reduced or even suppressed. The cross section of a separating tube remains extensively open as a result of said measure.

In a preferred manner, one or several separating surfaces, in particular also in a bundle of tubes, are also arranged in an inclined manner in relation to the vertical. Good contact with the rising aerosol is effected as a result.

Said effect can be improved as a result of the underside of a beveled tube being longer than the top side.

A drip edge which tapers toward one end is produced on the underside of the tube in this way, as a result of which, the drip behavior, in turn, is improved.

In addition, it has proven advantageous to arrange the separating element in a tube elbow inside an air tube. The diverting of the air flow in the region of the separating element improves the contact behavior between the traversed air and the surfaces provided for separation.

Said effect can be further improved by a tube elbow being provided in an air tube on both sides of the separating element.

An improvement in the invention can also be achieved as a result of a multiple-step arrangement, i.e. provided one behind another in the direction of flow. As a result, it is possible to enlarge the separating surface with smaller pressure losses compared to a continuous separating element. In addition, the different steps can be adapted to the type of aerosol that occurs, for example to the size of the droplets. Such adaptation can be performed, for example, as a result of different geometries.

An exemplary embodiment of the invention is shown in the drawing and is explained below by way of the figures, in which, in detail:

FIG. 1 shows a schematic representation of a setup of the drying apparatus of a household appliance according to the invention, FIG. 2 shows a schematic longitudinal section through an air tube with a separating element according to the invention, FIG. 3 shows an enlargement of a detail from FIG. 2 and FIG. 4 shows a schematic detail of a cross section of a separating element according to FIG. 2.

FIG. 1 shows a primary circuit 1 and a secondary circuit 2 for a dishwasher. The primary circuit 1 includes a hygroscopic liquid, for example a lithium chloride solution. The secondary circuit 2 provides an air circuit.

The primary circuit 1, in this case, includes a container 3, for example with the lithium chloride solution 4. The lithium chloride solution 4 can be sucked up via a line 5 by means of a pump 6 which is developed as a circulating pump 6. The solution is heated by a heating means 7, as a result of which moisture can escape and consequently the extracting means, namely the lithium chloride solution 4, can be concentrated. The electrolyte solution 4 finally passes into a contact chamber 8 in which the primary circuit 1 is connected to the secondary circuit 2. Consequently, in the contact chamber 8 the hygroscopic liquid, for example the lithium chloride, comes into contact with the air to be dried.

The secondary circuit 2 blows the drying air by means a fan 10 into the working chamber 11 of the dishwasher where it dries moist washing items 10' in an item basket. The drying air is sucked out of the working chamber 11 inside the secondary circuit 2 by means of the flow drive of the fan 10 via the line 12 and passes into the contact chamber 8.

In this case, moisture is extracted from the drying air by means of the extracting means, that is the hygroscopic liquid. The extracting means 4 is heated during said exothermic operation and, in this case, in turn, can also heat the drying air.

The drying air together with droplets of the extracting means passes via the air line 13 into the separator 14 which, according to the invention, utilizes the wall of an air duct as the separating surface.

In the preferred embodiments shown according to FIGS. 2 to 4, in this connection, a bundle of tubes 15 is used as the separating element inside the air line 13. FIG. 4 shows the cross section of such a bundle of tubes in part such that it is graphically clear that in this connection a plurality of air ducts is arranged in the direction of flow S. This type of separating element in the form of a bundle of tubes 15 hardly reduces the air resistance and consequently hardly brings about any pressure differences.

At the same time, each tube has a length which is a multiple of the diameter such that, on the one hand, a large contact face is provided as a separating surface and, on the other hand, a high amount of contact time is provided for the traversing air.

The bundle of tubes 15 is arranged in an inclined manner with reference to the horizontal such that a gravimetrically determined direction of flow is produced downward for the separated liquid.

At the end of the tubes they are beveled, as can be seen in particular in the enlarged detail according to FIG. 3.

It can additionally be seen in FIG. 3 that the tubes of the bundle of tubes 15 are also inclined in relation to the vertical by an angle b. It can be seen in the embodiment shown that the incline, by means of which the tube is beveled, is provided in such a manner that the opening of the tube is inclined in relation to the vertical by an angle c which is greater than the angle b. Consequently, separated liquid flows through the tube arrangement and the arrangement of the incline as far as up to the bottom-most end of the tube, a side view of which is shown as tip 17. Consequently optimum drip formation can occur there, it being possible for the drips to drip off vertically downward.

As can be seen in FIG. 2, a tube elbow 18, 19 is arranged in each case on both sides of the bundle of tubes 15 such that the complete air flow is effected two times through the separator 14, that is it is diverted upstream and downstream of the separating element 15. The separation of finer droplets in the separator 14 can be improved as a result.

The invention is not restricted to the exemplary embodiment shown, in particular the arrangement of a separator 14 according to the invention is not restricted to a circulation as in FIG. 1. The contact chamber 8 in particular can be developed in an arbitrary manner. Mechanical distributing elements, for example, for distributing the extracting means 4, can also be arranged in said chamber. The two circuits 1 and 2 only provide an example for the use of a hygroscopic liquid for drying air in a household appliance.

The essential point in the case of the invention, however, is rather the development of a separator according to the invention in which the walls of one or of several air ducts are used as separating surfaces.

LIST OF REFERENCES

1 Primary circuit
2 Secondary circuit
3 Container
4 Lithium chloride solution
5 Line
6 Pump
7 Heating
8 Contact chamber
9 Liquid
10 Housing
11 Working chamber
12 Air line
13 Air line
14 Separator
15 Bundle of tubes
16 Tube
17 Tip
18 Tube elbow
19 Tube elbow

What is claimed is:

1. In a household appliance having a drying apparatus, having a primary circuit with a hygroscopic liquid and a secondary circuit, the secondary circuit having a contact chamber with a contract zone for extracting moisture out of air, which originates from a working chamber of the household appliance, and provides contact between the air and the hygroscopic liquid to separate the moisture out of the air, wherein the improvement comprises a separator element with a separating surface disposed outside the contact chamber and downstream from the contact chamber in the direction of flow to separate liquid droplets from air flow from the contact chamber and return the liquid droplets to the contact chamber in the primary circuit.

2. The household appliance according to claim 1 wherein the separating surface is extended transversely by the surface of the wall of an air duct in the direction of the air flow in the separator element.

3. The household appliance according to claim 2 wherein several air ducts are provided with walls which form separating surfaces in the separator element for the separation of the liquid droplets from air flow from the contact chamber.

4. The household appliance according to claim 1 wherein the separator element includes a bundle of several tubes in the separating surface.

5. The household appliance according to claim 4 wherein the bundle of several tubes is arranged in an inclined manner with respect to a horizontal alignment to provide a gravimetrically determined direction of flow for a separated liquid.

6. The household appliance according to claim 1 wherein the separator element includes one or several tubes with a downwardly inclined end.

7. The household appliance according to claim 6 wherein the separator element includes one or several tubes with an underside longer than a top side.

8. The household appliance according to claim 1 wherein one or several separating elements have a tip to provide an optimum drip formation.

9. The household appliance according to claim 1 wherein one or several separating surface(s) have a pointed or V-shaped tip.

10. The household appliance according to claim 1 wherein the separator element is arranged in a tube elbow inside of an air tube.

11. The household appliance according to claim 10 wherein the tube elbow has an elbow on the air tube on both sides of the separating element.

12. A household machine with a moisture extractor comprising:
 (a) a primary circuit having a hygroscopic liquid container connected to a pump and a contact chamber with a return line to the hygroscopic liquid container;
 (b) a secondary circuit having a working chamber connected at one end to the contact chamber and connected at the other end to a separator device disposed in the secondary circuit outside the contact chamber and downstream from the contact chamber; and
 (c) an air flow drive to move air in the secondary circuit through the working chamber, the contact chamber and the separator device.

13. The household machine of claim 12 wherein the separator device removes smaller liquid droplets from air from the contact chamber in the secondary circuit.

14. The household machine of claim 12 wherein the contact chamber and the separator device are connected by an air duct.

15. The household machine of claim 14 wherein a wall of the air duct covers the separator device and provides a separating surface area for the separation of liquid droplets from air from the contact chamber.

16. The household machine of claim 14 wherein a wall of the air duct covers several air ducts having walls to form a plurality of separating surface areas for the separation of liquid droplets from air from the contact chamber.

17. The household machine of claim 14 wherein the air duct includes a tube elbow for the separation of liquid droplets from air from the contact chamber.

18. The household machine of claim 12 wherein the separator device includes a bundle of several tubes to remove smaller liquid droplets from air from the contract chamber in the secondary circuit.

* * * * *